Jan. 31, 1956    W. L. HAWK    2,732,880
APPARATUS FOR APPLYING PLASTIC
SHEETING TO METAL PLATES
Filed Sept. 22, 1953    5 Sheets-Sheet 1

INVENTOR
WATSON L. HAWK
BY
Gardner & Zimmerman
ATTORNEYS

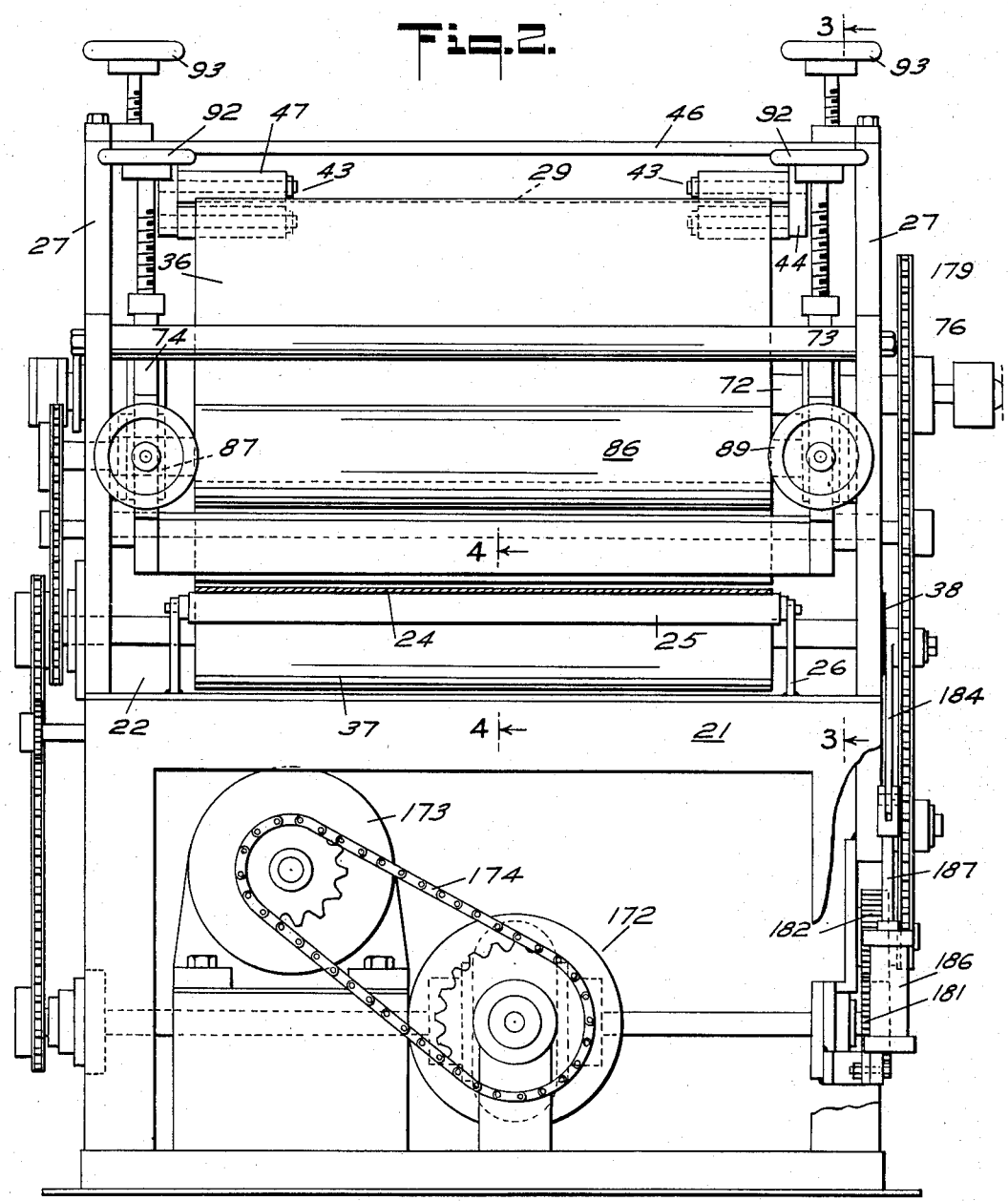
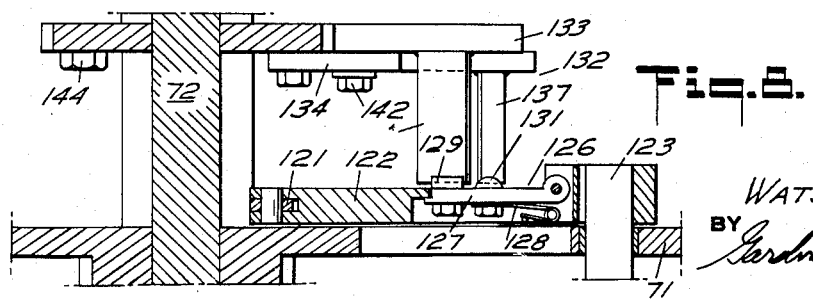

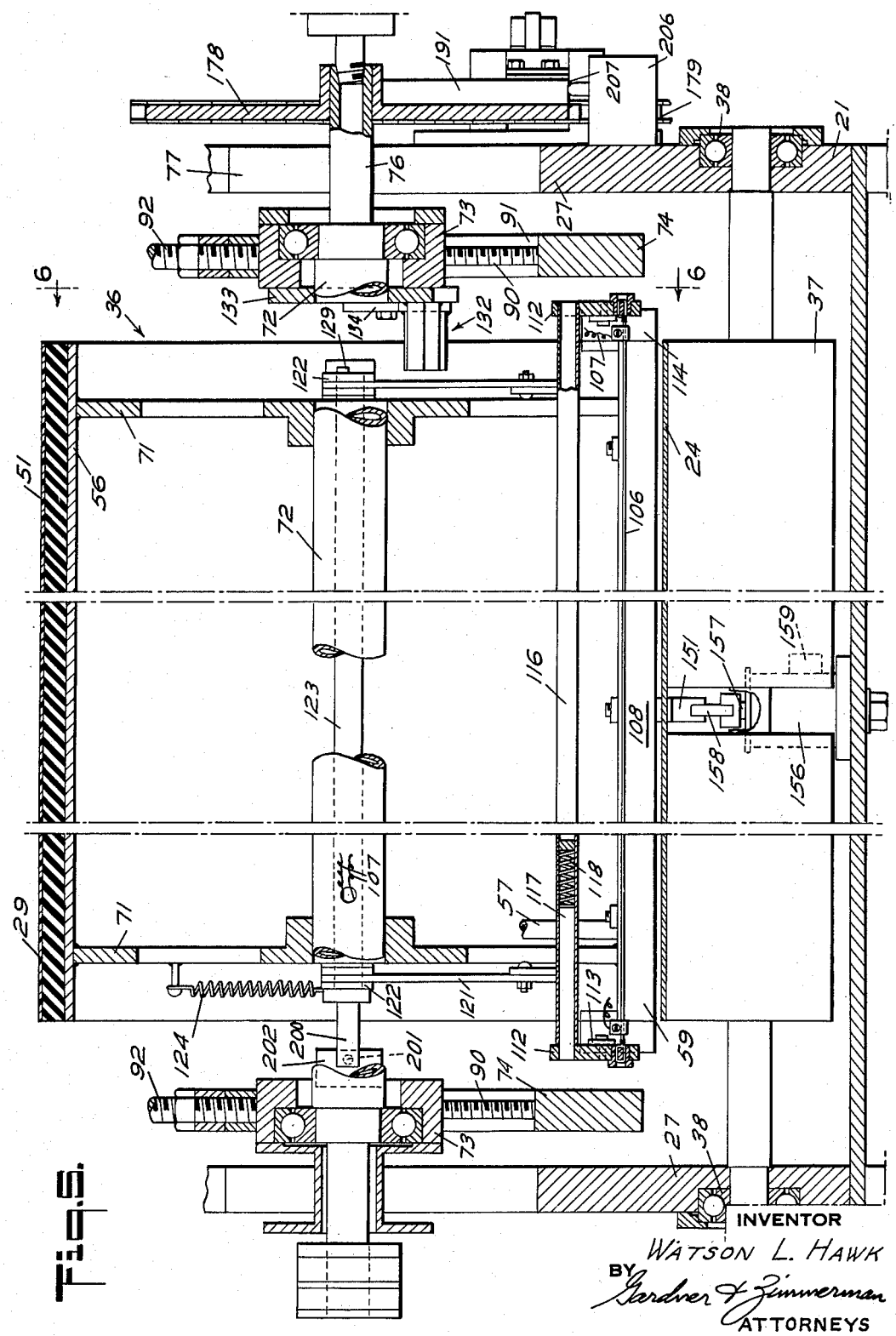

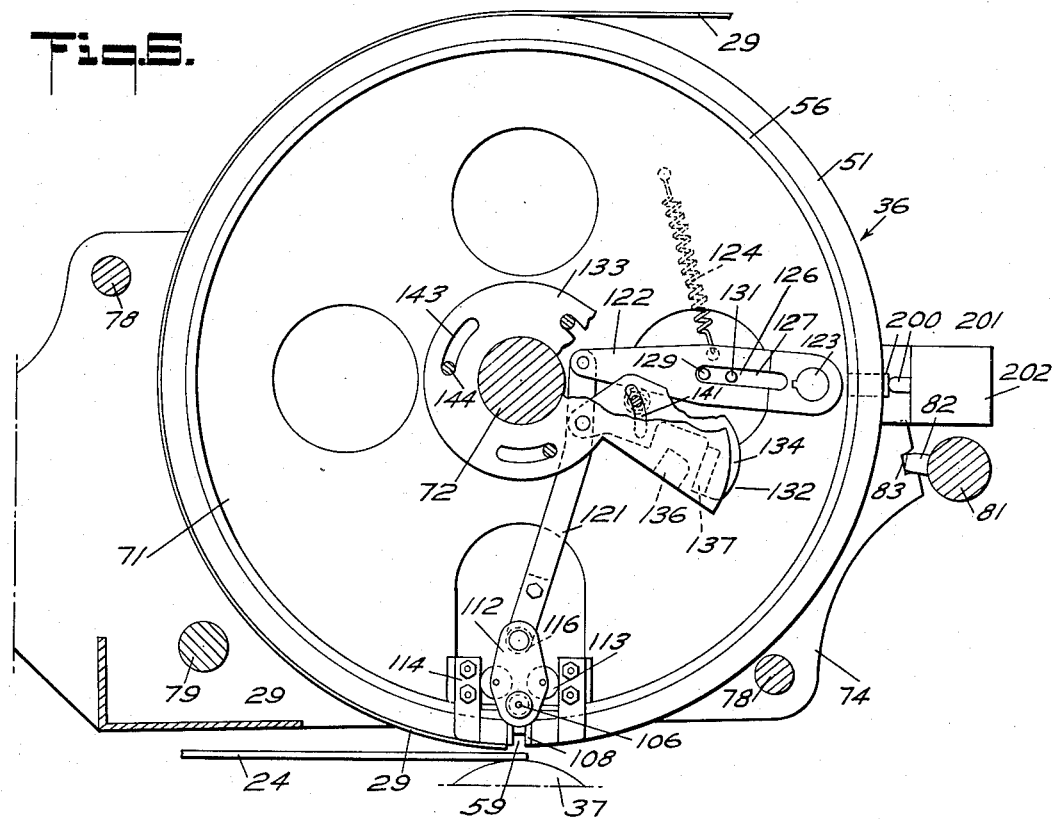
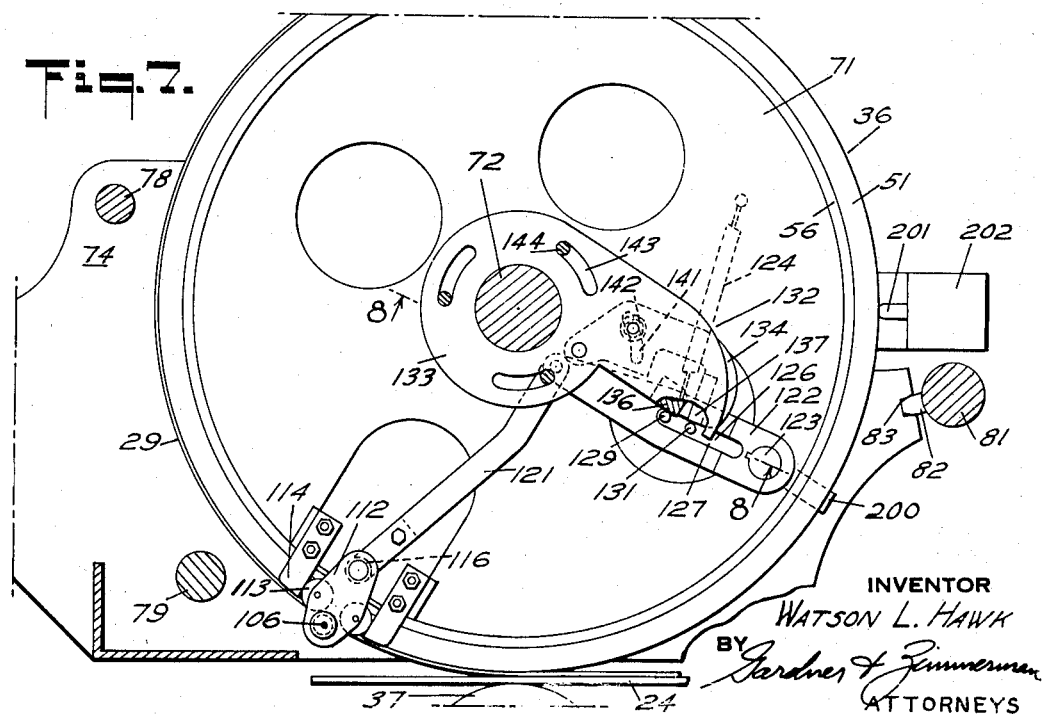

United States Patent Office 2,732,880
Patented Jan. 31, 1956

2,732,880
APPARATUS FOR APPLYING PLASTIC SHEETING TO METAL PLATES

Watson L. Hawk, Richmond, Calif., assignor to Rheem Manufacturing Company, Richmond, Calif., a corporation of California Application September 22, 1953, Serial No. 381,631

8 Claims. (Cl. 154—1)

This invention relates generally to the construction of metal containers with a non-metallic internal linear, and more specifically, towards appaartus for applying and securing a plastic sheeting to a surface of a metal plate whereby the latter may be subsequently rolled or bent into desired container form.

For a better understanding of the use, problems, and general background of this type of container construction, reference may be had to the co-pending application of Martin A. Orlins, Serial No. 351,019, filed April 24, 1953, entitled Method of Forming Interior-Lined Sheet Metal Containers. In said application, the entire process of construction of such containers is set forth, necessarily including the step comprising the application and securing of the plastic liner to the metal plate. The present invention, however, only deals with apparatus which may be utilized for performing this step, and as will be later made clear, the apparatus of this invention may be likewise employed independently of said method, as well as in connection with construction other than plastic lined metal containers.

Irrespective of the subsequent operations, in many instances it may be necessary or desirable to apply and secure a relatively flexible and elastic liner or sheeting onto the flat surface of a metal plate or the like. It will be appreciated that although the broad concept of performing the foregoing step may be simple, the problems involved in the design and construction of the actual apparatus can be most complex.

Accordingly, it is an object of the present invention to provide apparatus in which a substantially continuous roll of plastic sheeting or the like is caused to be placed upon a series of flat plates whereby the latter may be individually removed from the apparatus with the sheeting secured thereto.

Another object of the invention is to provide apparatus of the character described in which means are provided for transversely cutting the sheeting to the desired length for the plate without interrupting the continuous application of the sheeting to the plate.

A further object of my invention is to provide apparatus of the above mentioned type in which the entire cycle of operation of applying the sheeting to the plate may be commenced, continued and halted entirely automatically.

A still further object of the invention is to provide apparatus of the type described in which means are provided for insuring a smooth and uniform laying of the sheeting on the plates, and in which such sheeting may overlie the entire upper surface of the plate or selective longitudinal and lateral areas thereof.

Yet another object of the invention is to provide apparatus for placing a liner of sheeting material onto a metal plate, which is compact in construction and in which the parts are so designed and arranged that the apparatus will be capable of performing its requisite functions in an efficient manner over considerable periods of time with little maintenance or operational difficulties.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 5 is a sectional view taken substantially in the plane indicated by line 5—5 of Figure 1.

Figure 6 is a sectional view taken substantially in the plane indicated by line 6—6 of Figure 5 showing the sheeting cutting wire in retracted position.

Figure 7 is a sectional view similar to Figure 6, but indicating the cutting wire in its radially extended or cutting position.

Figure 8 is a sectional view taken substantially in the plane indicated by line 8—8 of Figure 7 illustrating details of the lever and latch and trip plate.

Figure 9 is a sectional view taken substantially in the plane indicated by line 9—9 of Figure 1 showing the laminating roll stop latch mechanism.

Figure 1:
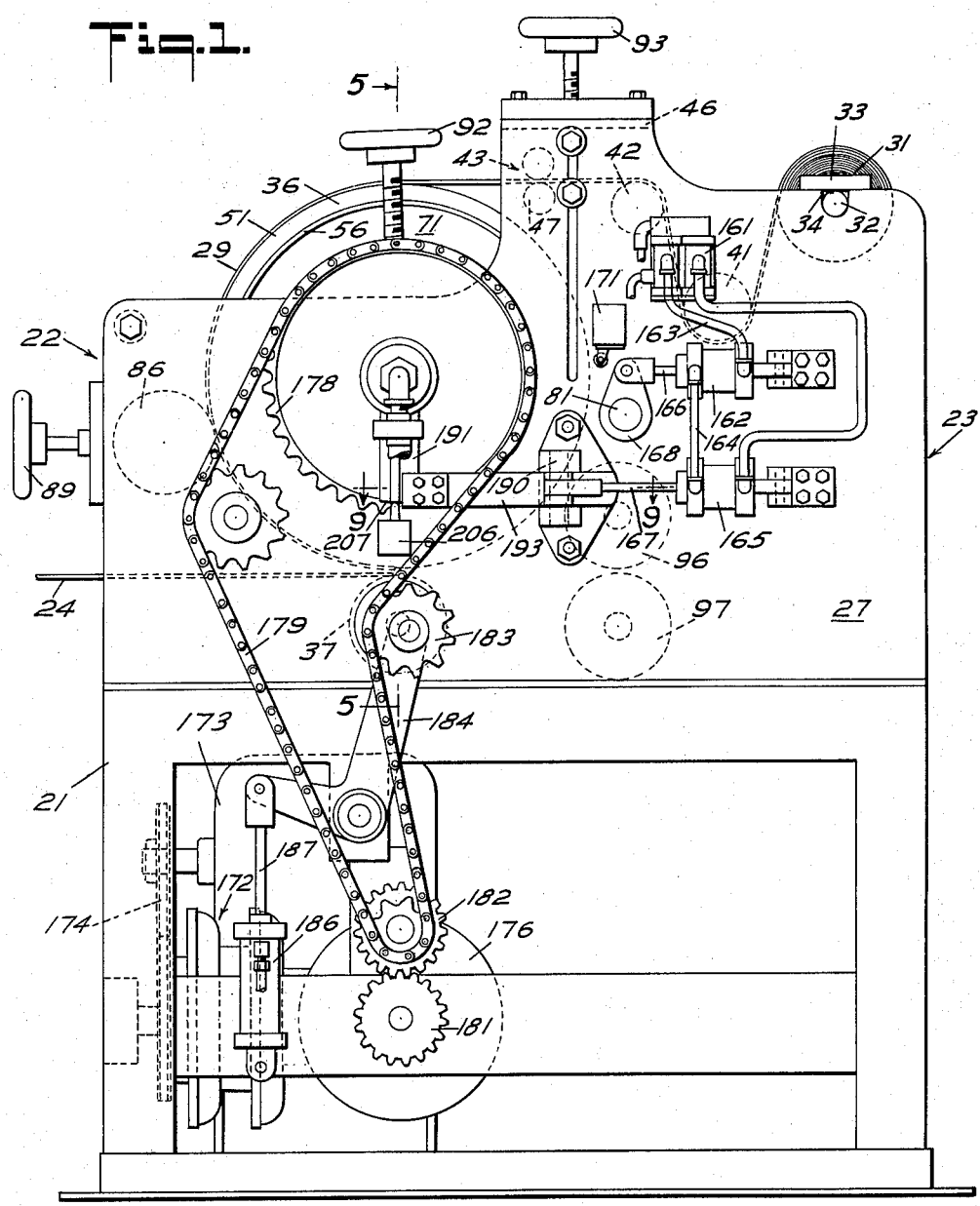
Figure 1 is a right side elevational view of the apparatus of the present invention.
Figure 2:
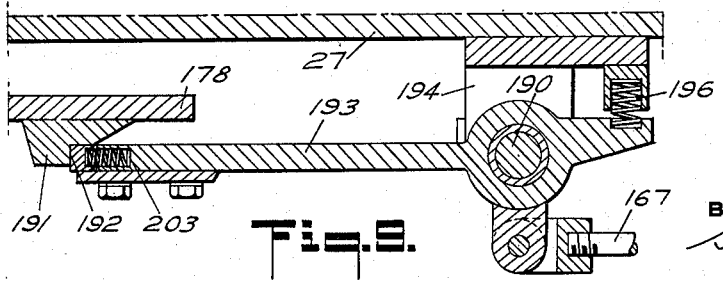
Figure 2 is a front elevational view looking into the receiving end of the machine.

In broad terms, the apparatus of the present invention includes means for supporting a metal plate preferably with a flat surface thereof disposed in horizontal relation for movement through the apparatus, means for supporting a roll or other substantially continuous quantity of plastic sheeting material, a laminating roller or drum disposed adjacent a glued surface of said plate, means for releasably maintaining a layer of said sheeting material on a portion of the circumferential extent of said drum whereby upon rotation of the latter while disposed immediately adjacent said plate the layer will be transferred from the drum to the plate, means for intermittently cutting said sheeting layer transversely to the direction of movement of said plate, and suitable control means for effecting properly timed movement of all of the foregoing parts. The plastic sheeting to be applied to the plates will usually have flexible and elastic characteristics such as found in Saran, mylar or the like, although it will be understood that this invention is not limited or confined to the application of any particular product or material.

Referring now to the drawings, the exemplary apparatus is disclosed as including a frame structure, generally indicated by the numeral 21 having a front or plate-receiving end 22 and a rear or plate-discharge end 23. The respective plates 24 may be brought to the front end of the apparatus by any suitable conveying mechanism and may likewise be carried from the rear end of the apparatus in a similar fashion after the plastic sheeting has been affixed to the upper surface of the plate. In order to support the plates 24 during their course of travel through the apparatus, transversely disposed roller members 25 are journalled in opposed flanges 26 inwardly spaced from side portions 27 of the frame so as to engage the lower surface of the plates in sliding relation and permit movement of the latter longitudinally through the apparatus.

Prior to the time that the plates 24 are introduced into the receiving end of the machine, a suitable adhesive coating may be placed upon the upper surface thereof so as to permit the ready engagement of the subsequently to be applied plastic sheeting 29 thereto. While the present invention is not directed towards any particular treatment of the plates, reference may again be made to the aforementioned Orlins' application for discussion of suitable bonds or adhesives for effecting such securing.

The Saran or other plastic sheeting is most conveniently arranged in a spool 31 which may be carried adjacent the upper rear end portion of the frame structure on a shaft 32. This shaft is journalled in a pair of bearings 33 mounted on the opposed side portions of the frame so as to permit unwinding of the spool and consequently a feeding of the sheeting. Preferably, said side portions are slotted as indicated at 34 to permit replacement of expended spools, and, if desired, suitable brake means of a type well known in the art may be utilized to prevent rotation of the spool when the sheeting is not being drawn therefrom as well as to insure spool rotation at a speed commensurate with the quantity of sheeting being removed.

Figure 3:
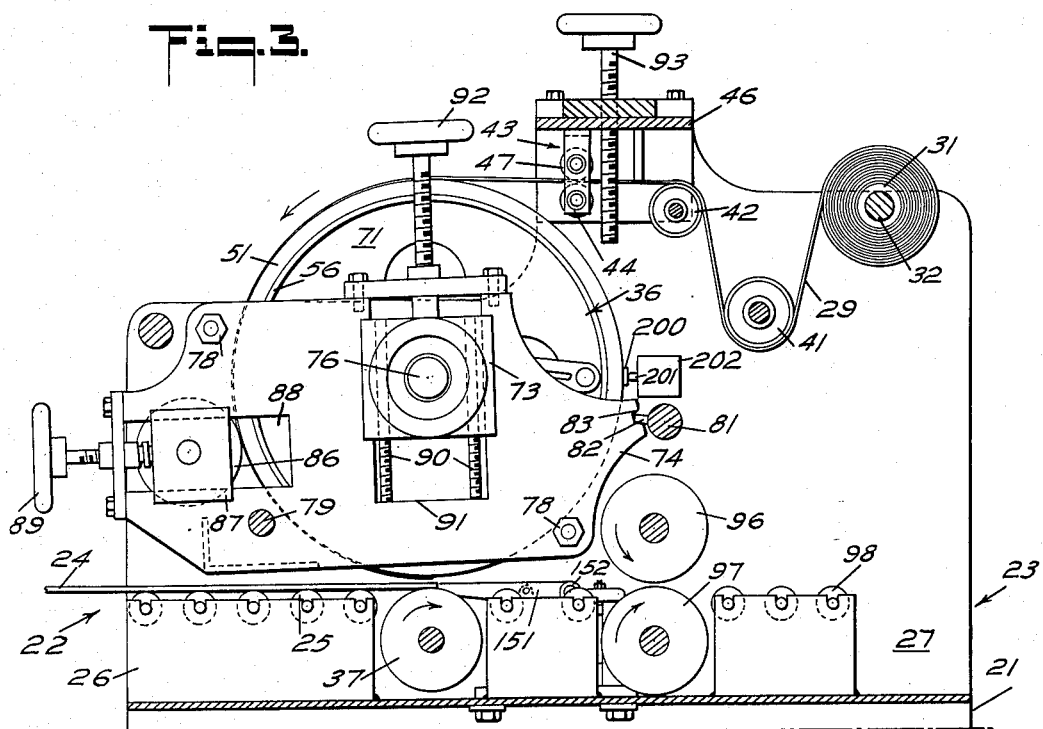
Figure 3 is a sectional view taken substantially in the plane indicated by line 3—3 of Figure 2.

As is best seen in Figure 3 of the drawings, the plastic sheeting 29 passes from the spool onto the forwardly disposed peripheral surface of a laminating roller or drum 36, such drum having an axis of rotation substantially parallel to the axis of spool 31 and normal to the longitudinal axis of the apparatus. The laminating roller is arranged to rotate in a counterclockwise direction as viewed in said figure, and by having the axis thereof substantially vertically spaced from the axis of a main plate support roller 37, when a plate is disposed on the roller 37, and the laminating drum is caused to descend towards the roller 37, a plate will be caught therebetween and rotation of the drum will effect movement of the plate towards the discharge end of the machine, and as will be later explained, with the sheeting affixed thereto.

Plate support roller 37 is illustrated as being journalled in a pair of bearings 38 carried by side portions 27 of the frame, and as will be understood, the upper surface of such roller lies in a common horizontal plane with the corresponding upper peripheries of the auxiliary roller members 25 whereby the plates may be properly supported.

In order to make the initial transfer of the sheeting 29 from the spool 31 to the laminating drum, the free end of such sheeting is passed under a first roll 41, thence over a second roll 42, and then the opposed lateral edges of the sheeting pass between sheet tensioning members 43 whose primary function is to place a lateral tension on the sheet to insure its smoothness in a lateral direction, the other portions of the mechanism placing a suitable longitudinal stretching force thereon. The tensioning members, as here shown, are disposed adjacent each side of the frame, mounted on a block 44 depending from a top plate 46 of the frame, and comprise a pair of relatively short stub rollers 47 journalled in said block, with the axes thereof directed inwardly and slightly forwardly of a true transverse axis. This angular irregularity will result in the opposite edges of the sheet being pulled outwardly and a desirable lateral tension applied to the sheet to eliminate the possibility of wrinkles or folds being present when the sheet engages the laminating drum 36 in a manner now to be described.

As will be noted, when the sheet passes between the sets of rollers, it is disposed substantially at the uppermost portion of drum 36 and may therefore be wound in a counterclockwise direction around the drum for approximately one-half of the circumference of the latter. Due to the provision of a rubber casing 51 which overlies the drum, the plastic sheeting will tend to adhere to the surface thereof in an unwrinkled condition. It will be apparent, however, that the limited amount of frictional resistance between the sheet and the drum casing would be insufficient to effect a longitudinal pull on the sheet great enough to unwind the spool 31. Therefore, some means must be provided which will engage the distal end portion of the sheeting 29 and effect simultaneous movement thereof with the drum, while permitting sequential transverse cutting of the sheeting which thus requires engagement of a new distal end portion of the sheeting.

As an important feature of the present invention, such sheet holding means contemplates the use of suction to releasably hold the sheet to the drum. In the illustrated embodiment of the invention, it will be noted that drum 36 is constructed of a cylindrical shell member 56 to which the rubber layer 51 is secured. Disposed within said shell 56 is a pair of pipes 57 suitably connected to a vacuum source, not shown, with distal portions of said pipes being connected to a pair of circumferentially spaced axially extending vacuum manifolds 58. Manifolds 58 are disposed adjacent each side of an axially extending slot 59 formed in the drum for a purpose presently to be described, and preferably comprise channel shaped elements 61 seated in grooves in casing 51 with the flanges thereof engaging the outer periphery of the drum shell 56. A plurality of axially spaced apertures 62 extend radially through the rubber layer or casing whereby a vacuum introduced in manifolds 58 will result in a radially inward suction on the drum on each side of the slot 59, and therefore, the plastic sheeting may be releasably held on the drum until the sheeting is permanently affixed to the plates. In other words, when the slot 59 passes its highest point of travel adjacent the tensioning rollers 47, both series of apertures will forcibly hold the plastic sheeting to the drum and pull the same with the drum as the latter is rotated. Likewise, after the sheeting has been cut, through the action of a cutter passing through the slot 59, the trailing series of apertures will still engage the distal end of the sheeting from the spool 31 and continue to pull the sheeting with the drum. It may be apparent at this point that with the trailing series of apertures engaged with the end of the sheeting and releasably holding the same against the drum periphery as indicated in Figure 6, if the drum is caused to be urged downwardly against a plate supported on the roller 37 and rotated, the plate will be moved to the right as viewed in the figures, and due to the upper adhesive surface of the plate and the drum pressure, the sheeting will be simultaneously transferred to the plate, as viewed in Figure 7. This transfer may be readily effected as the linear speed of the drum periphery and of the plate will be the same. Thus, by starting each cycle of operation with the plate positioned as indicated in Figures 1, 3 and 6 of the drawings, the drum positioned as similarly shown in these views, and by having the drum circumference substantially equal to the length of the plate, it will be understood that a single revolution of the drum will cause the entire length of the plate to be covered by the sheeting. The width of the sheeting can obviously be varied to accommodate various plate widths or the particular covering requirement. It may also be noted that the drawings indicate the leading edge of the plate slightly in advance of the end of the sheet 29 at the commencement of operations. This, of course, will result in a marginal edge portion of the plate not being covered with the sheeting, and the drum size and sheet cutting operation is likewise arranged to leave a similarly exposed rear marginal portion. This arrangement is desirable when such marginal portions may be subsequently rolled together and welded. However, if the entire plate was to be covered, it would only be necessary to increase the drum size proportionately and start the operation with the end of the sheet disposed vertically above the leading edge of the plate.

With the drum disposed sufficiently close to roller 37 so as to firmly clamp a plate therebetween, it would not be possible to slidably insert sequential plates for application of the sheeting thereto. Accordingly, so long as individual plates are utilized which may be irregularly spaced from each other as they enter the receiving end of the apparatus, it is necessary that the vertical spacing between the adjacent peripheries of drum 36 and support roller 37 be selectively adjustable. This could be done in a number of ways, but in the preferred embodiment of the invention, the drum 36 is provided with means for effecting generally vertical movement thereof from and towards the plate-support or back-up roller 37.

As here shown, the drum 36 is provided with end plates 71 which carry an axial shaft 72, portions of which are journalled in a pair of bearing blocks 73 which are carried on a pair of laterally spaced yoke members 74 inwardly spaced from the respective frame side portions 27. One end 76 of the shaft extends through its associated bearing block and through a slot 77 in frame side 27 for connection to a driving member which will be later discussed. The respective yoke members 74 may be secured together for unitary movement by one or more laterally extending tie members 78, and both of such members 74 are journalled for rotation about a rocker shaft 79 carried by the frame sides. From the foregoing, it should be apparent that by rocking the yoke members about shaft 79, the drum shaft will be moved along an arcuate path about the shaft 79. However, as the amount of movement is relatively small in comparison to the effective radius of curvature, the result will be a substantial vertical movement of the drum shaft and drum selectively from and towards the back-up roller 37.

To effect oscillation of the yoke members about the shaft 79, an actuating shaft 81 is journalled in the frame and is disposed adjacent the rear end of the yoke members. Shaft 81 is provided with radially extending lugs 82 engageable in slots 83 of the yokes, and thus, by rotating the shaft through a limited number of degrees, in either of two directions, the yoke members will be likewise caused to oscillate accordingly, and the drum 36 raised or lowered.

If desired, to insure the tight engagement of the sheeting 29 on the drum periphery, a pinch roll 86 may be rotatably carried in bearing blocks 87 mounted on the yoke members. In order to selectively control the resistance between the pinch roll and the drum, the blocks 87 may be movable in longitudinal slots 88 formed in the yokes, with a suitable manually movable adjustment screw 89 engageable therewith.

In a similar fashion, the lowermost position of drum 36 may be selectively varied to permit entry of plates having varying thicknesses or gauges. In this case, the drum bearing blocks 73 are slidable in vertical slots 91 provided in the yokes, and selectively fixed therein by screws 90 engaged with such blocks and yokes respectively, a pressure lock screw 92 being also incorporated therewith.

Still another screw 93 may be utilized to vertically position the sheet tensioning rollers 47 as will be best seen by referring to Figure 3 of the drawings.

Further details of the operational portion of the apparatus may include a pair of discharge guide rollers 96 and 97, and, if desired, a power take-off system may be utilized for carrying away the plates, but for reasons of simplicity, there is merely shown a plurality of plate supporting discharge rollers 98 adjacent the rear end of the apparatus.

There will now be discussed in detail, the mechanism for transversely cutting the plastic sheeting while the latter is still maintained in contiguous relationship to the drum periphery. As will be best indicated in Figure 7 of the drawings, the cutting is arranged to take place after the drum has rotated through approximately 300 degrees of rotation, and the plate 24 is therefore substantially entirely covered except for the trailing end surface thereof. The cutting of the plastic sheeting is preferably effected by means of an axially extending wire 106 which is normally disposed within drum slot 59, but which may be caused to be suddenly moved radially outwardly from the slot to cut the sheeting transversely of the direction of movement of the latter. Also, in order to make a fast and smooth cut in the sheeting, the wire is electrically or otherwise heated by passing a current therethrough by means of conductors 107 or the like connected to a suitable source of electric current through the hollow drum shaft 72. As the hot wire will always be disposed in adjacent relationship to slot 59 and therefore to the rubber drum casing 51, it is desirable to line the opposed edges of the slot with a shield 108 made out of asbestos or other heat insulating material. In this manner, there will be no likelihood of the rubber casing being deformed by radiation of heat from the wire.

Means are provided adjacent the exterior surfaces of each of the drum end plates 71 for effecting the aforesaid radial movement of the wire 106 at some selectively particular rotational position of the drum. As here indicated, the ends of the wire are connected to radially outward portions of the blocks 112, such blocks being provided with a pair of rollers 113 which are in sliding engagement with a pair of radially extending guide rails 114 bolted or otherwise secured to the outer surface of the respective end plates of the drum. In this manner, movement of the blocks is capable only by movement of the rollers which are restricted to motion radially of the drum. The blocks at the opposite ends of the drum are interconnected together for unitary movement by means of a hollow shaft 116 interposed between the blocks, shown in Figure 5, in which is telescopically mounted a shaft 117 on which one of the blocks is connected, the other block being connected directly to the shaft 116. By placing shaft 117 under axial outward pressure, as by means of a spring 118, the two blocks will be yieldably connected together for movement generally tangential of the drum, and positively held together for movement radially of the drum.

The radial inward portions of blocks 112 are pivotally connected to the outer ends of arms 121 disposed generally radially of the drum, whose other ends are pivotally connected to levers 122 extending generally normal to the arms and which are mounted on the respective drum end plates on shaft 123. The end of the lever to which arm 121 is connected is normally urged in a clockwise direction about shaft 123 by a spring 124 which results in the arm 121 being pulled inwardly and consequently the wire 106 will remain entirely disposed within the confines of its slot 59. Means are provided, however, for intermittently rocking the lever and its shaft 123 in a contra direction for moving the wire out of the slot.

By referring to Figures 6 to 8 of the drawings, it will be seen that lever 122 is provided with a latch member 126 which includes a pivotally mounted latch 127 which is normally urged into adjacent relationship with the outer planar surface of the member by a spring 128. Latch 127 carries a stop member 129 having a generally rectangular head, and longitudinally spaced therefrom a trip member 131 having an arcuate external configuration. Members 129 and 131 are mounted for engagement with a trip plate assembly 132 mounted on a plate 133 which is carried by the right hand stationary drum support bearing block 73. Plate 133 is provided with a leading edge 136 which is in the path of movement of the rotating stop member 129. When the latch rotates with the drum to a position adjacent said leading edge 136 the latter will engage the stop member 129 forcing the lever 122 in a counterclockwise direction and resulting in the wire 106 being forced through the plastic sheeting. However, with continued drum rotation, an offset cam portion 137 carried by a member 134 of assembly 132 will strike the rounded trip member 131 forcing the latch inwardly and permitting the trip member 129 to pass the trip plate assembly, at which time the spring 124 will snap the wire back to its inoperative inward position.

The rotational drum position when the trip plate assembly engages the latch may be adjustably varied by swinging the former through an arcuate slot 141 and locking the same to plate 133 by lock bolts 142. Likewise, the entire plate 133 may be rotatably positioned on the bearing block by means of arcuate slots 143 through which the connecting bolts 144 pass which mount the plate on the blocks.

The drive mechanism and controls for all of the previously discussed portions of the apparatus should not be construed as being limited to that disclosed in the drawings and about to be described, but it will be appreciated that irrespective of the particular mechanism and controls which may be utilized, they must be so correlated and inter-related to perform the necessary operations in timed sequence on the operating portions of the apparatus. It therefore seems most appropriate to describe the driving mechanism in conjunction with the operation of the machine.

Figure 4:
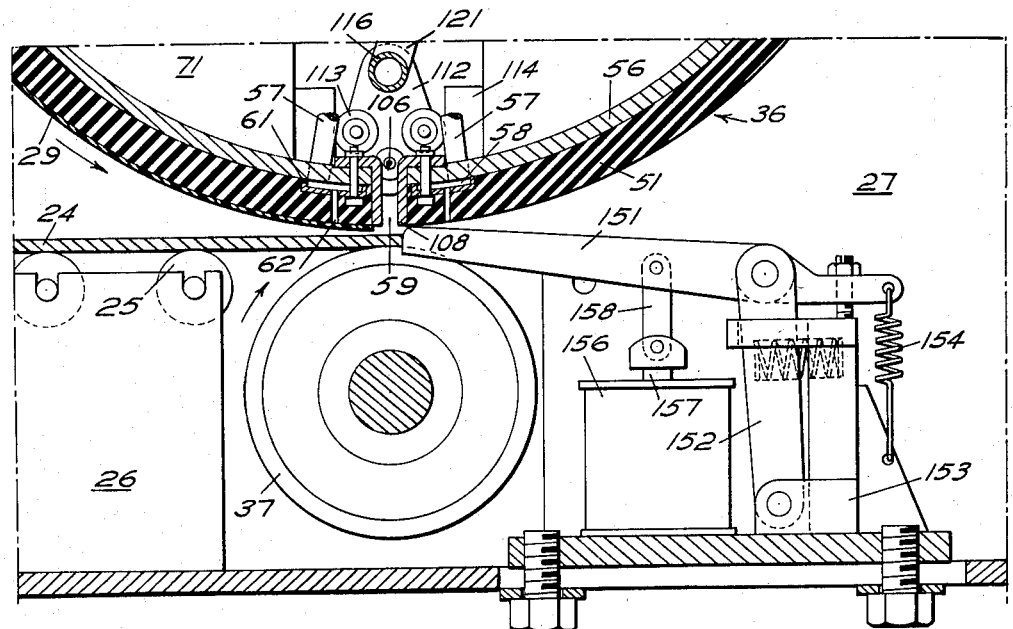
Figure 4 is a sectional view taken substantially in the plane indicated by line 4—4 of Figure 2.

To start the operational cycle, a plate 24 is rolled on the rollers 25 until the leading edge thereof is positioned slightly forward of a vertical plane interconnecting the axes of the drum 36 and support roller 37. At this time, the drum is positioned as indicated in Figure 4 of the drawing with the slot 59 directed downwardly and the leading edge of sheeting 29 positioned only on what might be termed the trailing edge of the slot. Obviously, if the entire plate is to be covered, the leading edge of the same would be vertically aligned with the leading edge of the sheeting. The proper longitudinal positioning of the plate may be determined in any suitable manner, but preferably by means of a stop lever 151 whose distal end is normally positioned to intercept the leading edge of an oncoming plate. An intermediate portion of said lever is pivotally connected to the upper end of a generally vertical bifurcated arm 152 which in turn is pivotally supported on a bracket 153 secured to the frame. The lever is normally positioned in its aforementioned plate-intercepting position by means of a spring 154, and the lever may be moved downwardly out of the path of the plate by means of a solenoid 156. The solenoid has a conventional piston 157 which is pivotally secured to lever 151 through a link 158. In operation, when the plate strikes the leading edge of the lever 151, it is moved rearwardly engaging a limit switch 159, the latter effecting inward movement of piston 157 and a pulling down of the lever permitting movement of the plate thereover.

Switch 159 is also connected to one or more solenoid air valves 161 and which, upon actuation of the switch causes air to pass into the rear end of an air cylinder 162 through conduit 163 and to the front end of a second air cylinder 165 through a conduit 164. Each of the cylinders is of the dual acting type and is provided with piston rods 166 and 167 respectively. Referring to Figure 1, when rod 166 is moved to the left, it imparts counterclockwise rotary movement to yoke actuating shaft 81 as the end of the rod is pivotally connected to a link 168 which is fixed to the shaft. Such rotation, as previously explained will cause the yoke members to rotate downwardly about their rocker shaft or pivot 79, thereby dropping the laminating drum and clamping the plate 24 between the drum and the back up roller 37.

It will also be noted that outward movement of rod 166 will result in the latter striking a limit switch 171 which is operatively connected to a magnetic clutch and brake assembly 172 of a type available on the market and well known in the art. This assembly is driven by a motor 173 through a suitable drive chain 174 and intermittently transfers power from the motor to a differential 176 which in turn drives the laminating drum in a manner now to be explained.

Referring particularly to Figures 1 and 5 of the drawings, it will be seen that the drum shaft 76 is connected to a sprocket 178 which is driven by a chain 179, such chain being moved by the differential through sprockets and drive members 181 and 182. In this manner, as the clutch is actuated, the drum will be rotated as previously described. In view of the fact that the drum shaft, and consequently the sprocket 178 is vertically movable, means must be provided to insure proper tension on the chain 179 at all times. This may be best accomplished by means of a take-up sprocket 183 which engages the chain and which is carried at one end of an angular lever 184, pivoted at the intersection of the arms thereof, and exerting a constant pressure on the chain by means of an air piston 186 whose rod 187 is pivotally connected to the other end of the lever.

It has been previously explained that the apparatus is particularly arranged to place the sheeting on a plurality of individual plates, and it is therefore necessary to have the sprocket 178 positively stopped at the end of each revolution, independently of disengagement of the clutch assembly 172. As here shown, sprocket 178 is provided with a radially extending strike plate 191 whose leading edge 192 is arranged to engage a stop lever 193 at the end of each revolution. Lever 193 is pivotally mounted on a vertical shaft 190 which is carried in a pair of spaced brackets 194. A spring 196 interposed between the frame and the end of the lever remote from the strike plate 191 urges the lever towards its strike engaging position. However, when piston rod 167 of air cylinder 165 is withdrawn, i. e., moved to the right as viewed in Figure 1, the lever will be rocked out of intercepting position by virtue of its pivoted connection to the lever. This, of course, is what happens when a plate initially engages stop lever 151 to actuate limit switch 159, and permits the sprocket 178 to start its cycle of rotation.

With the laminating roll being driven in the manner just described, the sheeting 29 will be transferred from the roll to the upper surface of the plate being forcibly moved thereunder. This rotation and transfer will continue even while the wire cut off is radially advanced through the sheeting for transversely cutting the same, which, as previously mentioned, takes place after the drum has been rotated at least 270 degrees and preferably around 300 degrees.

To stop the rotational cycle, a cam 200 is provided on the periphery of the drum which strikes a rod 201 of a limit switch 202. This switch serves to deactivate the magnetic clutch assembly and likewise actuates solenoid air valve 161, directing air to the rear end of air cylinder 165 resulting in extension of rod 167 and movement of the lever 193 into sprocket locking position. To cushion the possible shock when a strike plate 191 hits the lever 193, the end of the latter may be provided with a spring cushioning member 203. Switch 202 could be likewise used to operate cylinder 162 for raising the drum, but this movement is shown as being effected by operation of a third limit switch 206. This latter switch is engaged by a cam 207 on sprocket 178, and may be operatively connected to air valve 161 causing retraction of piston rod 166 and consequently clockwise rotation of shaft 81 and raising of the drum.

It will be apparent to those skilled in the art that various combinations of the just described switches would be equally effective, and due to the action of spring 196 on the stop lever 193, and the fact that this lever need only be momentarily moved outward to permit the strike plate to pass the same, it may not be necessary to incorporate any forward movement of the rod 167 for proper operation.

From the foregoing description, the details of construction and mode of operation of the apparatus of the present invention will be apparent to those skilled in the art. It will be appreciated that this apparatus is capable of relatively high speed automatic operation and will insure the smooth application of a plastic sheeting layer on metal plates.

I claim:

1. Apparatus of the character described including a frame, plate support means mounted on said frame, a plastic sheeting laminating roller disposed in spaced but adjacent relationship to said support means, means for rotating said roller, said roller being provided with an axially extending slot, a radially movable axially extending cutting element mounted within said slot and normally disposed completely within the peripheral extent of said roller, means for moving said cutting element radially outward of said roller during each revolution of the latter, means for releasably holding plastic sheeting onto the periphery of said roller adjacent both sides of said slot, said means including a plurality of apertures extending on both sides of said slot, and means for creating a suction force in said apertures.

2. Apparatus of the character described including a longitudinally extending frame structure, a pair of yoke members pivotally mounted on opposed side portions of said frame, a sheeting laminating-drum journalled in said yokes along an axis longitudinally spaced from said pivotal mounting of said yoke members, means for rocking said yoke members whereby said drum axis may be selectively varied, and a plate support member disposed subjacent said drum in substantial vertical spaced relation thereto.

3. Apparatus as set forth in claim 2 in which said rocking means includes a shaft substantially parallel to said drum axis and having a radial lug thereon, slot means in said yokes on the side of said drum axis opposite to said yoke pivotal connection receiving said lug, and means for selectively rotating said shaft in both directions.

4. A sheeting laminating drum comprising a generally cylindrical member having an axially extending slot therein, a suction manifold extending axially along said member adjacent said slot, means defining a plurality of radially extending apertures extending to the outer periphery of said member and in communication with said manifold, a sheeting cutting member disposed substantially within said slot, guide means for directing said cutting member radially and exteriorly of said slot, and means effecting selective inward and outward radial movement of said cutting member.

5. Apparatus as set forth in claim 4 in which said cylindrical member is provided with a rubber casing.

6. A drum on which a layer of flexible sheeting may be releasably engaged comprising: a generally cylindrical member having an axial shaft, a pair of spaced bearing blocks for rotatably supporting end portions of said shaft, said member having an axial slot therein, guide means on an end portion of said member adjacent said slot, a sheeting cutting element disposed in said slot, support means for said cutting element engageable with said guide means, said support means including a lever, and cam means on said bearing block engageable with said lever in selected positions of rotation of said drum whereby said support means may be moved radially outwardly and move said cutting element radially outwardly of said slot.

7. Apparatus as set forth in claim 6 in which means are provided for normally urging said cutting element to a radial inward position.

8. Apparatus for applying a layer of plastic sheeting on a metal plate having an adhesive on a surface thereof, comprising: means for supporting a plate for horizontal movement of the latter, means for supporting a spool of plastic sheeting, a laminating drum disposed in parallel spaced relation to said supporting means, automatic means for effecting selective movement of said drum from and towards said plate supporting means, means for rotating said drum, means halting rotation of said drum at the end of each single rotation, means releasably holding a layer of said sheeting on a portion of the outer peripheral surface of said drum whereby said layer may be transferred onto said plate, means for transversely cutting said drum sheeting layer during rotation of said drum, a stop member interposed between said plate supporting means and said drum and adapted to position a plate, and means associated with said stop member for actuating said drum rotating means upon engagement of a plate with said stop member.

References Cited in the file of this patent
UNITED STATES PATENTS

| | | |
|---|---|---|
| 1,590,167 | Howard | June 22, 1926 |
| 1,874,224 | Barnett et al. | Aug. 30, 1932 |
| 2,010,308 | Leonard, Jr. | Aug. 6, 1935 |
| 2,289,336 | Bamford | July 14, 1942 |
| 2,334,963 | Spinner et al. | Nov. 23, 1943 |
| 2,384,231 | Bamford | Sept. 4, 1945 |
| 2,434,795 | Glasing et al. | Jan. 20, 1948 |
| 2,445,254 | Winterburn | July 13, 1948 |
| 2,483,458 | Fischer et al. | Oct. 4, 1949 |
| 2,568,463 | Reynolds | Sept. 18, 1951 |
| 2,627,213 | Nye | Feb. 3, 1953 |
| 2,638,037 | Knowlton | May 12, 1953 |
| 2,704,107 | Dyment | Mar. 15, 1955 |